US011732511B1

(12) United States Patent
Lim et al.

(10) Patent No.: US 11,732,511 B1
(45) Date of Patent: Aug. 22, 2023

(54) INFORMATION HANDLING SYSTEM DISPLAY STAND MOUNT LOCK

(71) Applicant: Dell Products L.P., Round Rock, TX (US)

(72) Inventors: Kok Lian Lim, Singapore (SG); Cheng-Chia Chiu, Taipei (TW); Chao-Long Chou, New Taipei (TW); Kerk Inn Pin Augustine, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/726,687

(22) Filed: Apr. 22, 2022

(51) Int. Cl.
*E05B 73/00* (2006.01)
*G06F 1/18* (2006.01)

(52) U.S. Cl.
CPC .......... *E05B 73/0082* (2013.01); *G06F 1/181* (2013.01)

(58) Field of Classification Search
CPC ......... E05B 73/0082; E05B 2073/0088; E05B 73/00
USPC .............. 361/679.57, 679.58, 724, 726–727; 248/551, 552, 553, 221.11, 222.13, 248/225.11, 917; 70/58, 59; 403/321, 403/322.1, 322.4, 325
See application file for complete search history.

(56) References Cited

U.S. PATENT DOCUMENTS

| 5,446,618 A * | 8/1995 | Tetsuya ............... E05B 73/0005 361/740 |
| 5,526,226 A * | 6/1996 | Katoh ................... G06F 1/1616 70/164 |
| 5,722,268 A * | 3/1998 | Choi .................... H05K 5/0208 70/57 |
| 6,178,089 B1 * | 1/2001 | Alfonso ............. E05B 73/0005 70/58 |
| 6,343,006 B1 | 1/2002 | Moscovitch et al. |
| 6,788,216 B2 * | 9/2004 | Chen .................. G08B 13/1445 70/57.1 |
| 7,175,152 B2 * | 2/2007 | Dittmer ................. F16M 13/02 248/222.51 |

(Continued)

OTHER PUBLICATIONS

Lenovo, "ThinkCentre Tiny-in-One 23," User Guide, downloaded from Microsoft Word—usereng-ThinkCentre Tiny-in-One 23-simple table-0812.docx (lenovo.com) on Dec. 8, 2022, 46 pages.

*Primary Examiner* — Christopher Garft
*Assistant Examiner* — Michael McDuffie
(74) *Attorney, Agent, or Firm* — Zagorin Cave LLP; Robert W. Holland (57) ABSTRACT

An information handling system locks to a display stand and/or an external object with a locking mount coupled to the display stand having a Kensington lock and a padlock. The locking mount has a lock switch with an unlocked position to accept and release the information handling system securing members and a lock position that engages the securing members with a lock plate to prevent removal of the information handling system. In the unlocked position, the Kensington lock and padlock loop are unavailable for securing the information handling system. In the locked position, the Kensington lock slot is unblocked to accept a securing cable and the padlock loop will extend from a retract position to accept a padlock. When a cable fits in the slot and/or a padlock fits in the padlock loop, the lock switch is engaged in the locked position to prevent removal of the information handling system securing members.

20 Claims, 11 Drawing Sheets

(56) References Cited

U.S. PATENT DOCUMENTS

| | | | |
|---|---|---|---|
| 7,227,747 B2 * | 6/2007 | Walker | E05B 73/0082 361/679.41 |
| 7,299,668 B1 * | 11/2007 | Lu | E05B 73/0082 70/57 |
| 7,353,672 B2 * | 4/2008 | Lu | E05B 73/0005 70/57 |
| 7,471,508 B2 * | 12/2008 | Martin-Otto | G06F 1/1656 361/679.55 |
| 7,565,824 B1 * | 7/2009 | Gleason | E05B 73/0082 248/552 |
| 7,611,118 B2 * | 11/2009 | O'Neill | F16M 11/22 248/917 |
| 7,886,903 B1 | 2/2011 | Wurzelbacher et al. | |
| 8,023,252 B2 * | 9/2011 | Dehaan | G06F 1/1656 361/679.01 |
| 8,111,511 B2 * | 2/2012 | Ruch | E05B 73/0082 312/240 |
| 8,432,688 B2 * | 4/2013 | Wang | G06F 1/1679 361/679.57 |
| 8,876,080 B2 * | 11/2014 | Lin | E05B 73/0005 248/553 |
| 10,524,369 B2 * | 12/2019 | Chiu | F16M 11/046 |
| 2005/0236533 A1 | 10/2005 | McRight et al. | |
| 2007/0125137 A1 * | 6/2007 | Galant | E05B 73/0082 70/58 |
| 2008/0104716 A1 * | 5/2008 | Hall | G06F 1/16 726/34 |
| 2012/0133591 A1 | 5/2012 | Simmons et al. | |
| 2012/0293940 A1 | 11/2012 | Gordon et al. | |
| 2021/0334417 A1 * | 10/2021 | Morrison | G06F 1/1656 |

\* cited by examiner

INFORMATION HANDLING SYSTEM DISPLAY STAND MOUNT LOCK

BACKGROUND OF THE INVENTION

Field of the Invention

The present invention relates in general to the field of information handling system security, and more particularly to an information handling system display stand mount lock.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems provide a convenient access to information for end users when traveling. Often hotels, airports and coffee shops will include information handling systems deployed for end users to rent or use temporarily at kiosks or business centers. One difficulty with this approach is that information handling systems generally need physical security to prevent theft. Further, desktop information handling systems typically found in business centers operate in cooperation with peripheral devices that are also subject to theft, such as a display, keyboard and mouse. A separate security cable to each of these tends to clutter a work environment and make the business center appear to be a security risk for end users. Further, separate security devices are complex to operate and expensive. An information technology professional in charge of a business center can easily lose track of security, resulting in theft or other loss of hardware, including information handling systems and peripherals that couple to the information handling systems by cables.

One form factor that has found adoption for use in public shared areas is the Micro Form Factor (MFF) Monitor Stand available from DELL, such as model MFS22. The MFF Monitor Stand has an OptiPlex Micro Desktop information handling system coupled to a display stand at a rear side so that a desktop information handling system capability and peripheral display are assembled as a single unit. Although the assembly of the information handling system to the display stand offers a more compact and aesthetically pleasing solution, the hidden location of the information handling system can make verification of its security difficult for information technology professionals. In addition, the information handling system cables must typically be organized and protected, such as by routing the cables through the display stand. When the information handling system housing is exposed at the rear side of the display, an unauthorized individual could access the cables and potentially disconnect and steal peripheral devices.

SUMMARY OF THE INVENTION

Therefore, a need has arisen for a system and method which secures a small form factor information handling system to a display stand.

In accordance with the present invention, a system and method are provided which substantially reduce the disadvantages and problems associated with previous methods and systems of securing an information handling system. A locking mount accepts security members of an information handling system with a lock switch in an unlocked position and enables coupling of locking devices like a security cable or padlock when the lock switch is moved to a locked position that prevents removal of the information handling system from the locking mount. In this manner, a centralized locking mechanism secures an information handling system by a four-in-one action of moving a lock switch to a locked position that enables a cable slot lock and padlock feature while also securing a cable cover to the information handling system.

More specifically, an information handling system couples to a display stand at a locking mount that disables coupling of a lock when the information handling system is not secured by movement of a lock switch to a locked position and enables coupling of the lock when the information handling system is secured by movement of the lock switch to a locked position. A lock plate interfaced with the lock switch translates movement between locked and unlocked positions of the lock switch to manage availability of external lock couplings, removal of the information handling system and removal of a cable cover at one side of the information handling system. A first member of the lock plate selectively captures a security member of the information handling system in the locked position to allow and prevent separation of the information handling system. A second member of the lock plate selectively blocks and unblocks a slot to enable and disable coupling of a security cable, such as a Kensington cable. A third member of the lock plate selectively allows extension and retraction of a padlock loop to enable and disable coupling of a padlock. A fourth member of the lock plate interfaces with a cable cover securing member to enable attachment and removal of the cable cover. The blocking member and padlock blocking member prevent movement of the lock switch to an unlocked position when an external lock couples to the locking mount. As a result, when an external locking mechanism, such as a Kensington cable or padlock, couples to the locking mount an end user is visually assure that the information handling system is secured and locked to the display stand.

The present invention provides a number of important technical advantages. One example of an important technical advantage is that a single sliding lock switch enables and disables coupling of an external locking mechanism to a locking mount so that the presence of an external locking mechanism visually confirms security of the information handling system and cable cover to the display stand. The information handling system and cable cover are secured with an intuitive mechanism readily verifiable with an external viewing of a display setup.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system is secured to a locking mount with a four-in-one action that enables a Kensington lock and/or a padlock to prevent removal of the information handling system and a cable cover. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
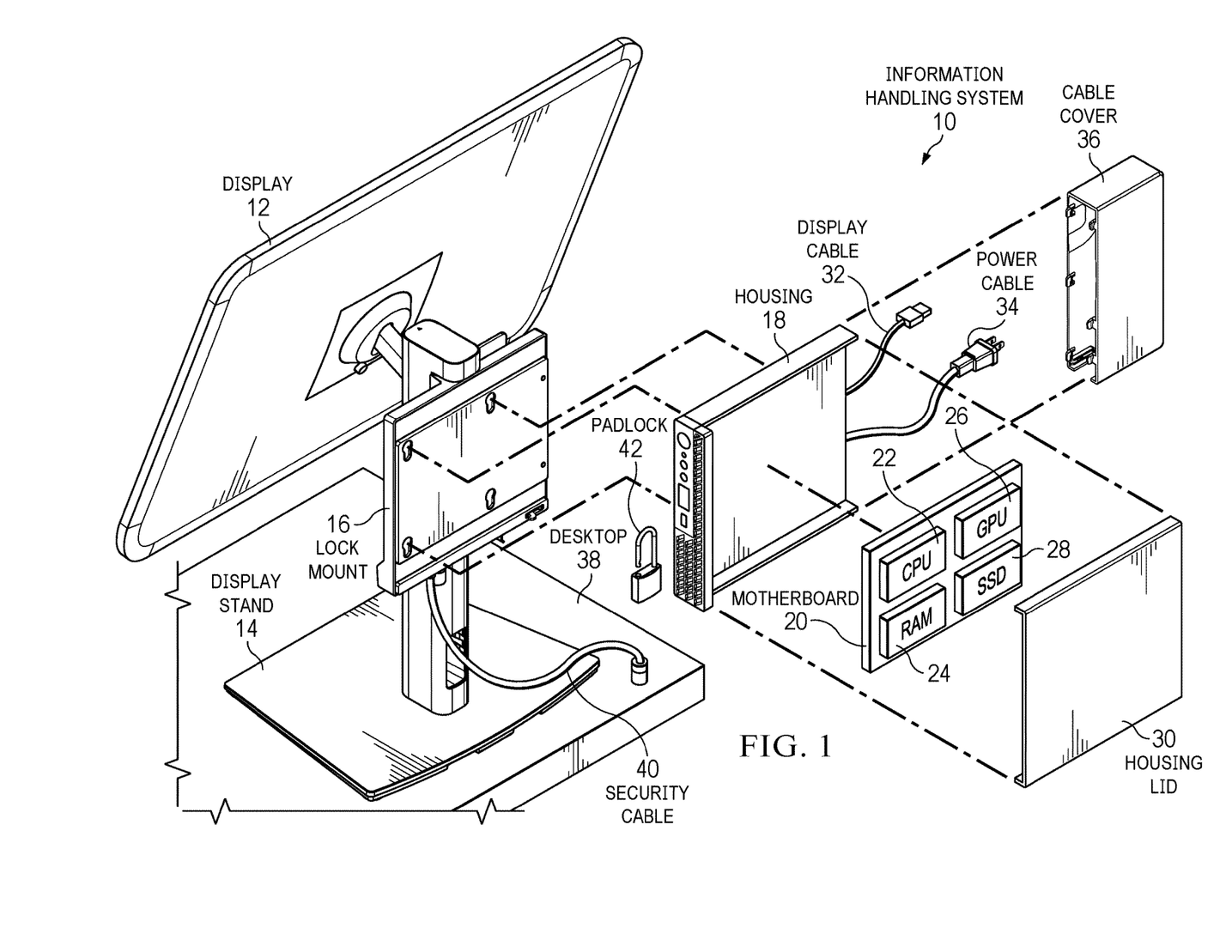
FIG. 1 depicts an information handling system arranged to couple to a display stand locking mount.

Referring now to FIG. 1, an information handling system 10 is depicted arranged to couple to a display stand 14 locking mount 16. Information handling system 10 processes information with processing components disposed in a housing 18 for presentation as visual images at a display 12 coupled to display stand 14. In the example embodiment, information handling system 10 has a motherboard 20 coupled inside housing 18 that interfaces the processing components, such as a central processing unit (CPU) 22 that executes instructions to process information and a random access memory (RAM) 24 that stores the instructions and information. A graphics processing unit (GPU) 26 further processes information to define visual images for presentation at display 12. A solid state drive (SSD) 28 provides persistent storage with non-transitory memory, such as to store an operating system and applications retrieved at power up and boot of the system to execute on CPU 22. A housing lid 30 couples over housing 18 to enclose the processing components. Power and communications for information handling system 10 are provided through cables that couple to ports at one side of housing 18. For instance, a display cable 32 couples to display 12 to communicate visual images for presentation, such as by communicating pixel values. A power cable 34 interfaces with external power, such as a wall power socket, to provide power to the processing components. To protect the cables from unauthorized access, a cable cover 36 couples to housing 18 over display cable 32 and power cable 34.

Locking mount 16 couples to display stand 14 to hold information handling system 10 in a secure manner at a desktop location 38, such as an enterprise or public location, to prevent unauthorized removal. Information handling system 10 couples to locking mount 16 and is then secured in place with an external locking mechanism, such as securing cable 40 and/or padlock 42. Securing cable 40 is, for instance, a Kensington cable that couples to a slot of locking mount 16 and to an external object, such as desktop 38, so that both display 12 and information handling system 10 are prevented from removal. Padlock 42 couples to locking mount 16 to lock information handling system 10 to display 12, although display 12 may be moved with information handling system 10 securely coupled in place. Locking mount 16 provides a centralized locking mechanism with Kensington and padlock interfaces that quickly enable by a slider switch at a bottom side of the locking mount. In addition, the cable cover is also locked on the information handling system whether the Kensington or padlock is used so that the cables cannot be accessed unless the locking mount is unlocked. The centralized locking mechanism provides four-in-one action by a slider switch that moves to a locked position to enable the Kensington and padlock use and that secures the information handling system and cable cover with an intuitive end user interaction.

Figure 2:
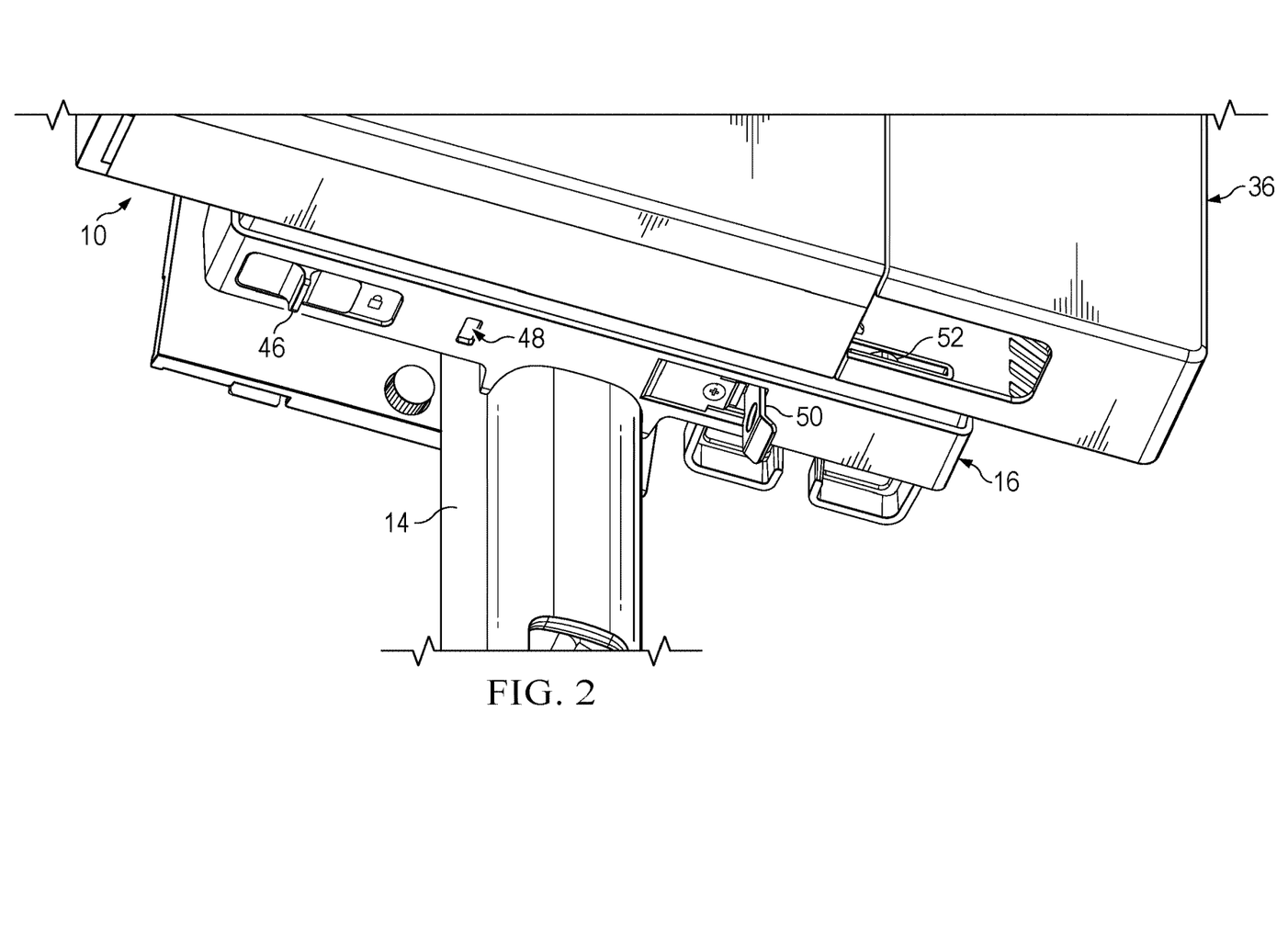
FIGS. 2, 2A and 2B depict an information handling system coupled to a display stand with a padlock and Kensington lock.
Figure 2A:
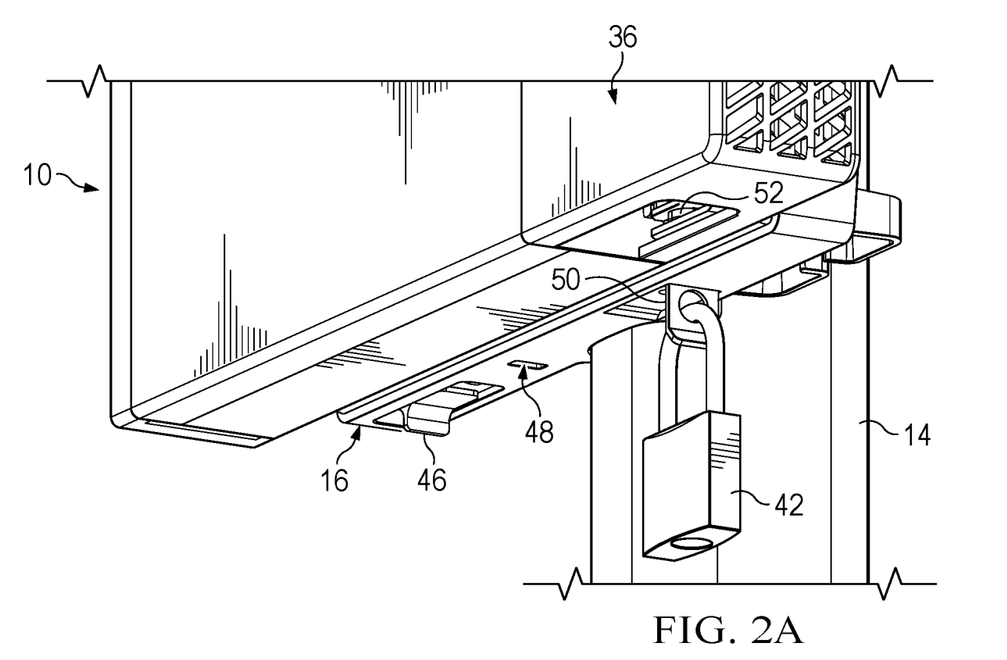
Figure 2B:
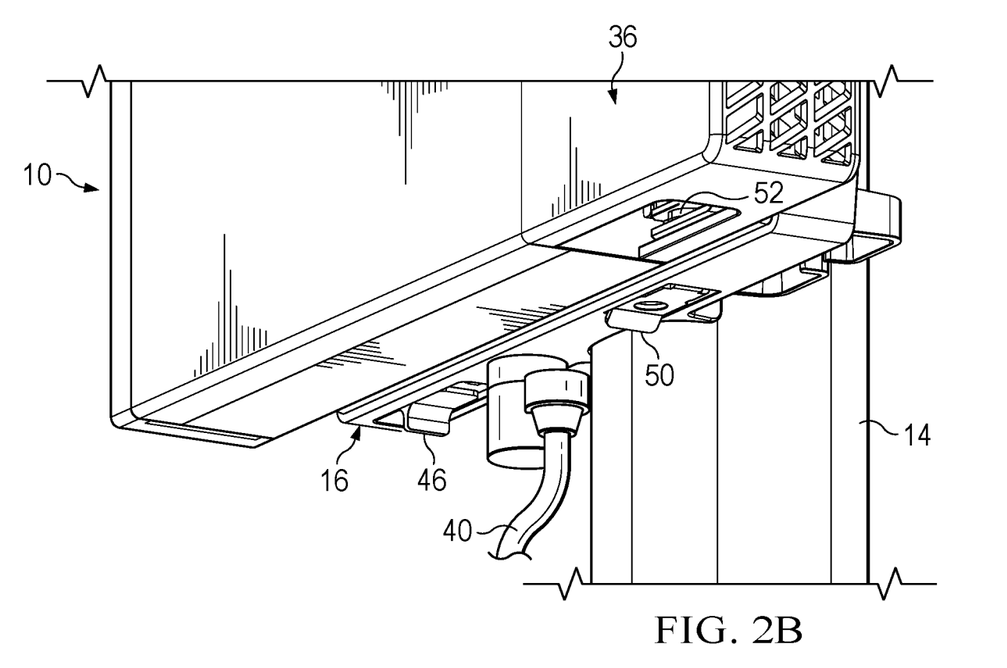

Referring now to FIGS. 2, 2A and 2B, an information handling system 10 is depicted coupled to a display stand 14 with a padlock 42 and Kensington lock 40. FIG. 2 depicts information handling system 10 coupled to locking mount 16 with a cable cover 36 coupled over cables at one side. Locking mount 16 accepts information handling system 10 and releases information handling system 10 when a sliding lock switch 46 is in an unlocked position. When lock switch 46 slides to a locked position a Kensington lock cable slot 48 is unblocked to allow insertion of a locking cable and a padlock loop 50 is released so that an end user can extend the padlock loop to couple a padlock in place. Further, when lock switch 46 moves to the locked position, a cable cover locking member 52 extends out from locking mount 16 to engage cable cover 36 and prevent removal of cable cover 36. FIG. 2A depicts padlock loop 50 extended out from locking mount 16 to accept a padlock 42. FIG. 2B depicts a Kensington lock 40 inserted into slot 48 and secured to prevent removal. Coupling padlock 42 to padlock loop 50 prevents removal of information handling system 10 from locking mount 16, however, the display assembly as a whole may be moved. Coupling a locking cable, such as the Kensington lock, to slot 48 prevents removal of information handling system 10 from locking mount 16 and also prevents movement of the display as a whole. When either padlock 42 or Kensington lock 40 couples to locking mount 16, lock switch 46 is prevented from movement to the unlocked position so that information handling system 10 is locked to locking mount 16 to prevent removal of information handling system 10 from the display assembly.

Figure 3A:
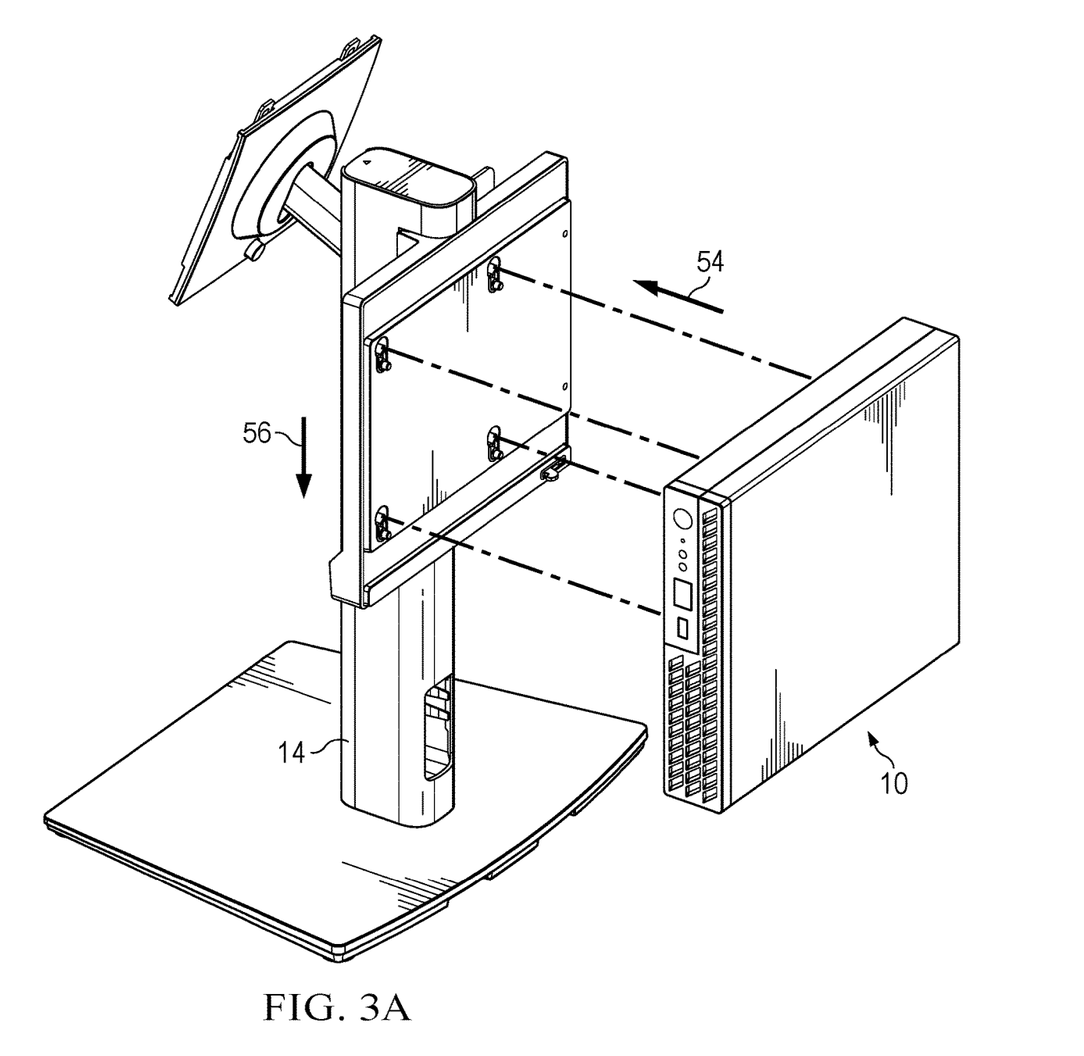
FIGS. 3A, 3B, 3C and 3D depict side perspective views of assembly of an information handling system to a locking mount with a cable cover secured in place.
Figure 3B:
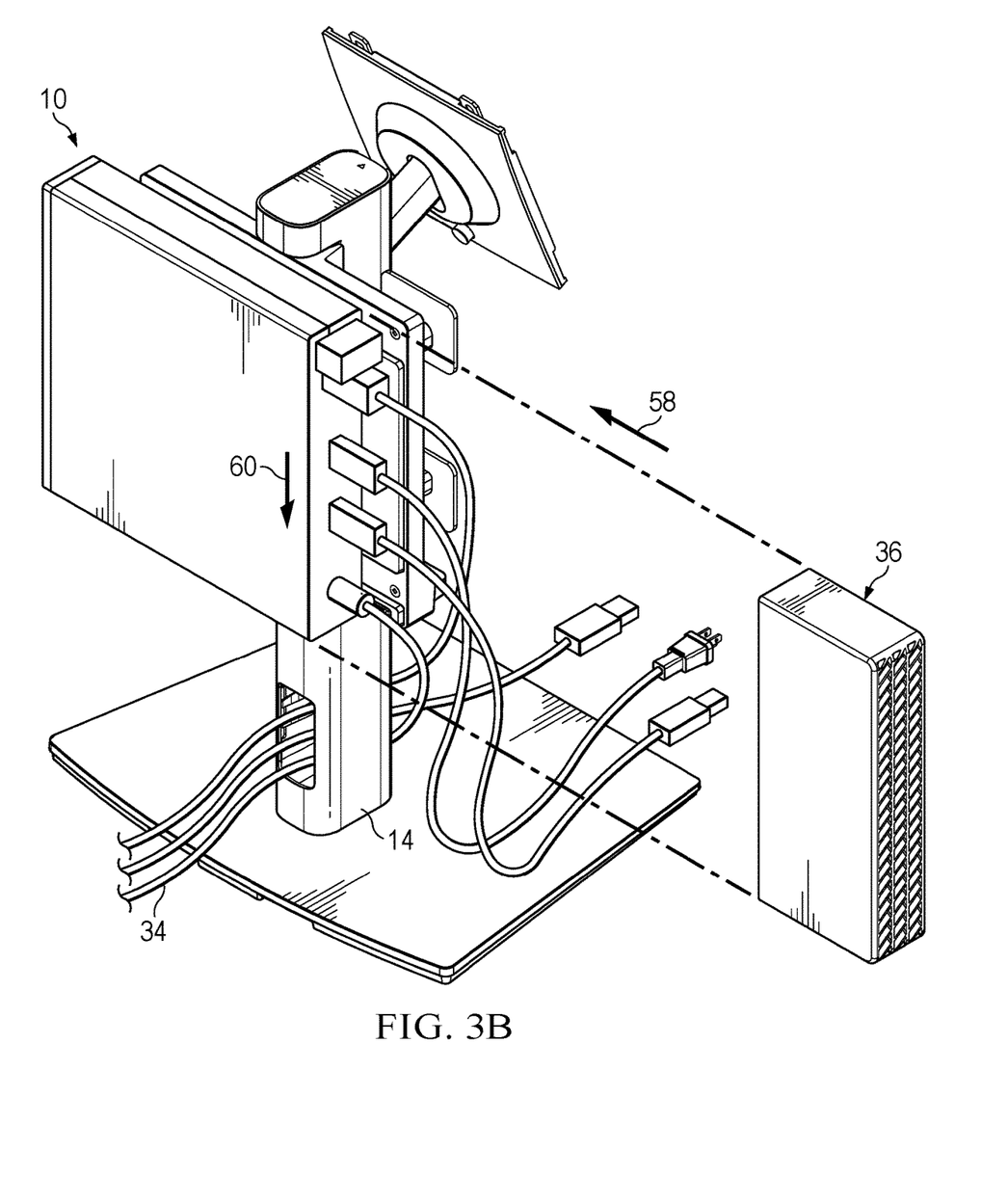
Figure 3C:
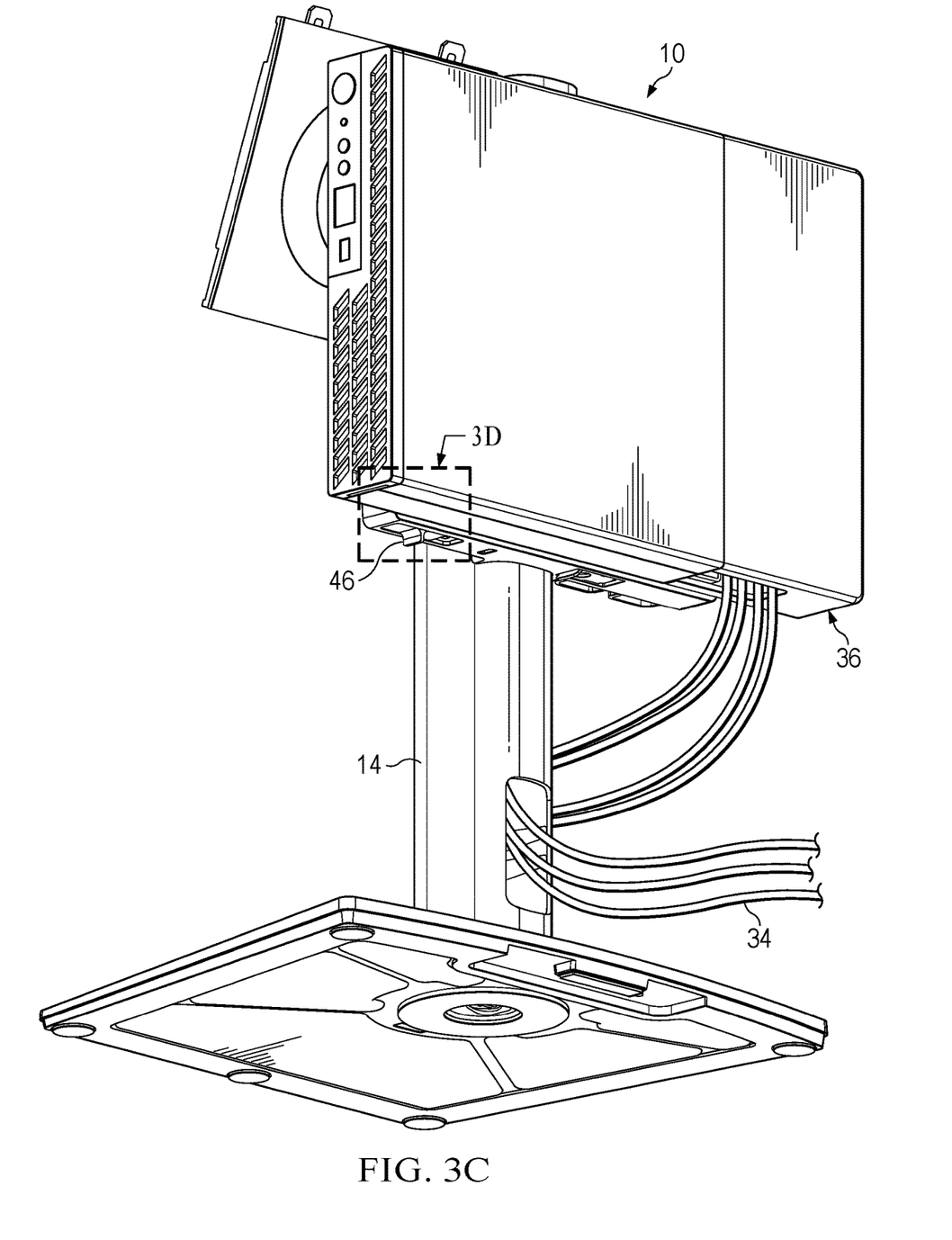
Figure 3D:
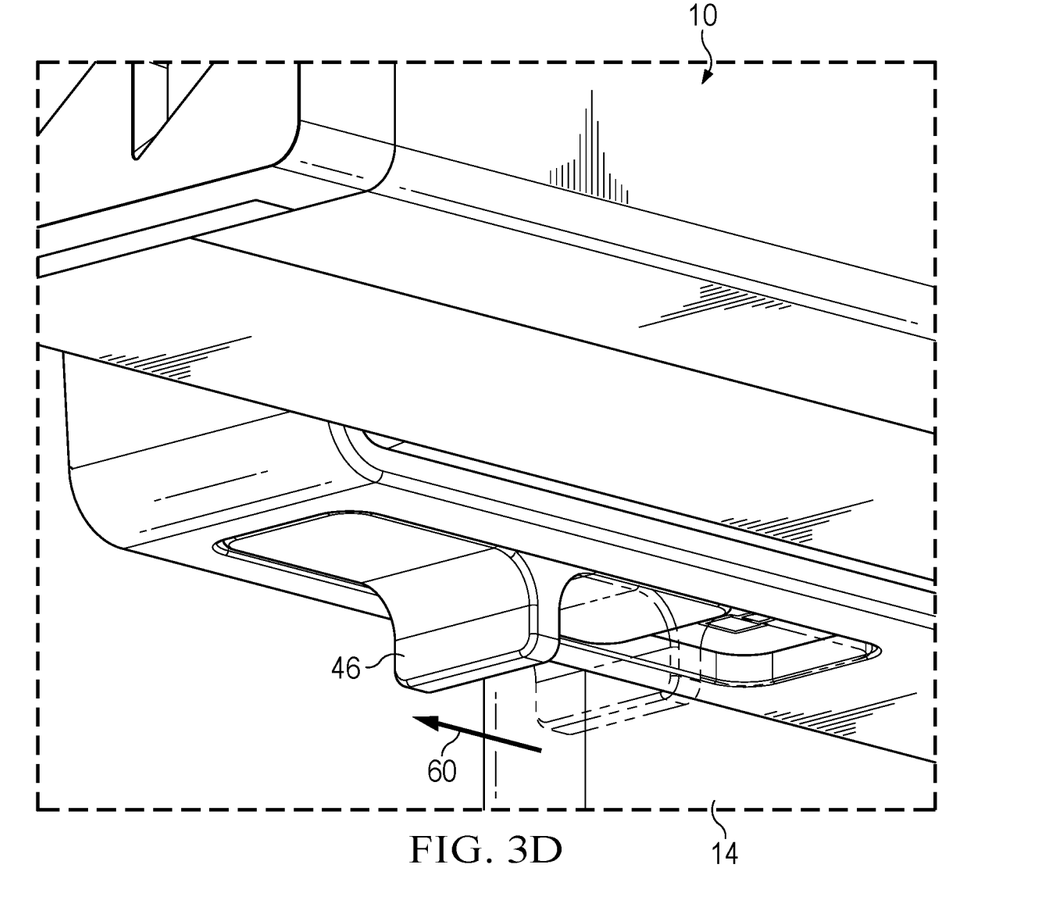

Referring now to FIGS. 3A, 3B, 3C and 3D, side perspective views depict assembly of an information handling system to a locking mount with a cable cover secured in place. FIG. 3A depicts information handling system 10 having securing members at a rear side aligned to insert into openings of locking module 16 as indicated by arrow 54. Once the securing members insert into the openings, a downward movement at display stand 14 as indicated by arrow 56 places a lip formed in the securing member behind an edge of the locking mount so that pulling direction outward will not allow removal of information handling system 10 from display 14. Rather, removal of information handling system 10 is performed by first lifting information handling system 10 to align the securing member lip with the larger portion of the openings of locking mount 16 and then pulling outward. FIG. 3B depicts cable cover 36 slid into place on information handling system 10 as indicated by arrow 58 and then coupled in place with a downward movement as indicated by arrow 60. Cable cover 36 covers and prevents unauthorized access to cables, such as power cable 34. Cable cover 36 may be coupled in place and removed when lock switch 46 is in an unlocked position, however, cable cover 36 is secured in place to prevent removal when lock switch 46 moves to the locked position. FIGS. 3C and 3D depict movement of lock switch 46 to a locked position as indicated by arrow 60 to secure information handling system 10 and cable cover 36 to the display stand 14. To remove information handling system 10 and cable cover 36, lock switch 46 must slide to the unlocked position. The ability to slide lock switch 46 between the locked and unlocked positions is supported as long as a padlock or Kensington lock are not coupled to the locking mount.

Figure 4A:
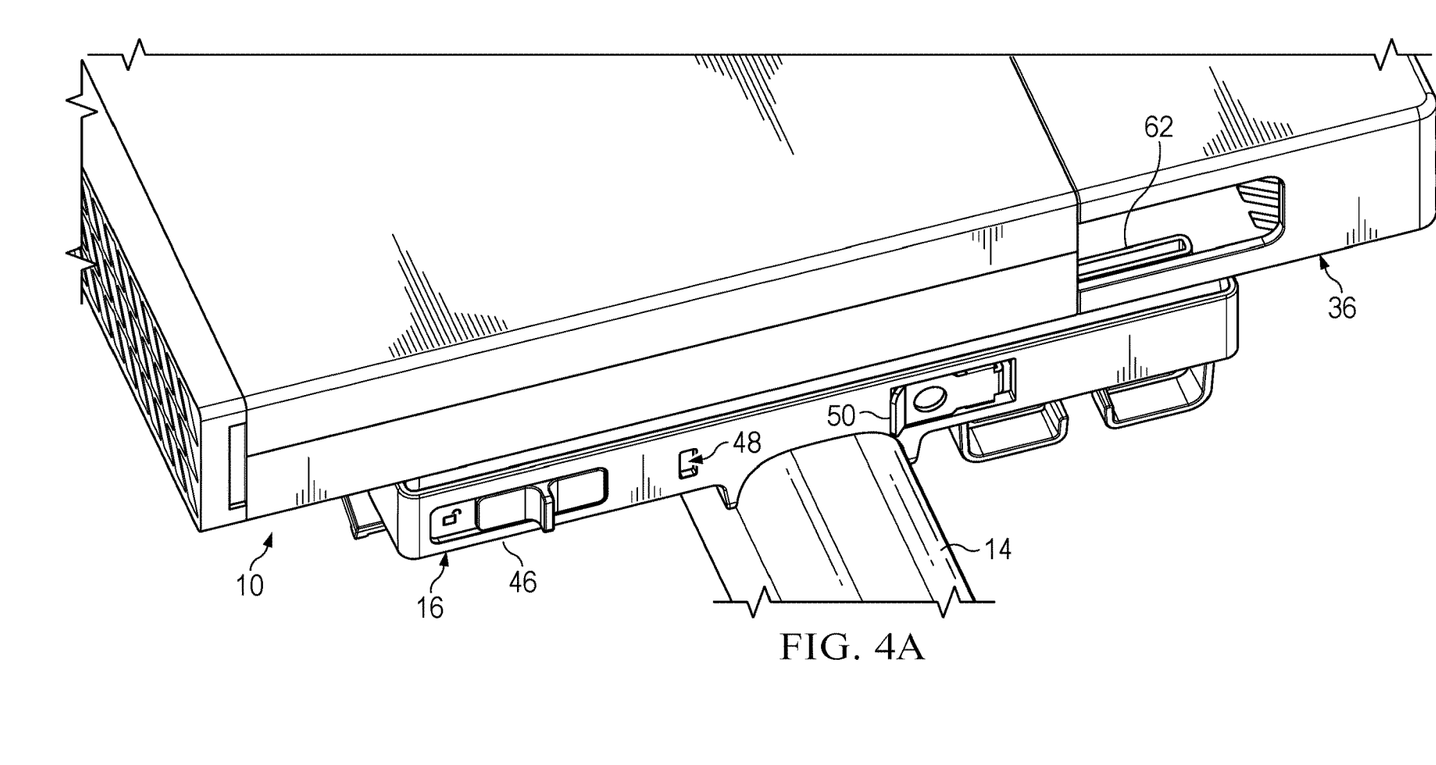
FIGS. 4A and 4B depict a lower perspective view of management of locking capability at a locking mount.
Figure 4B:
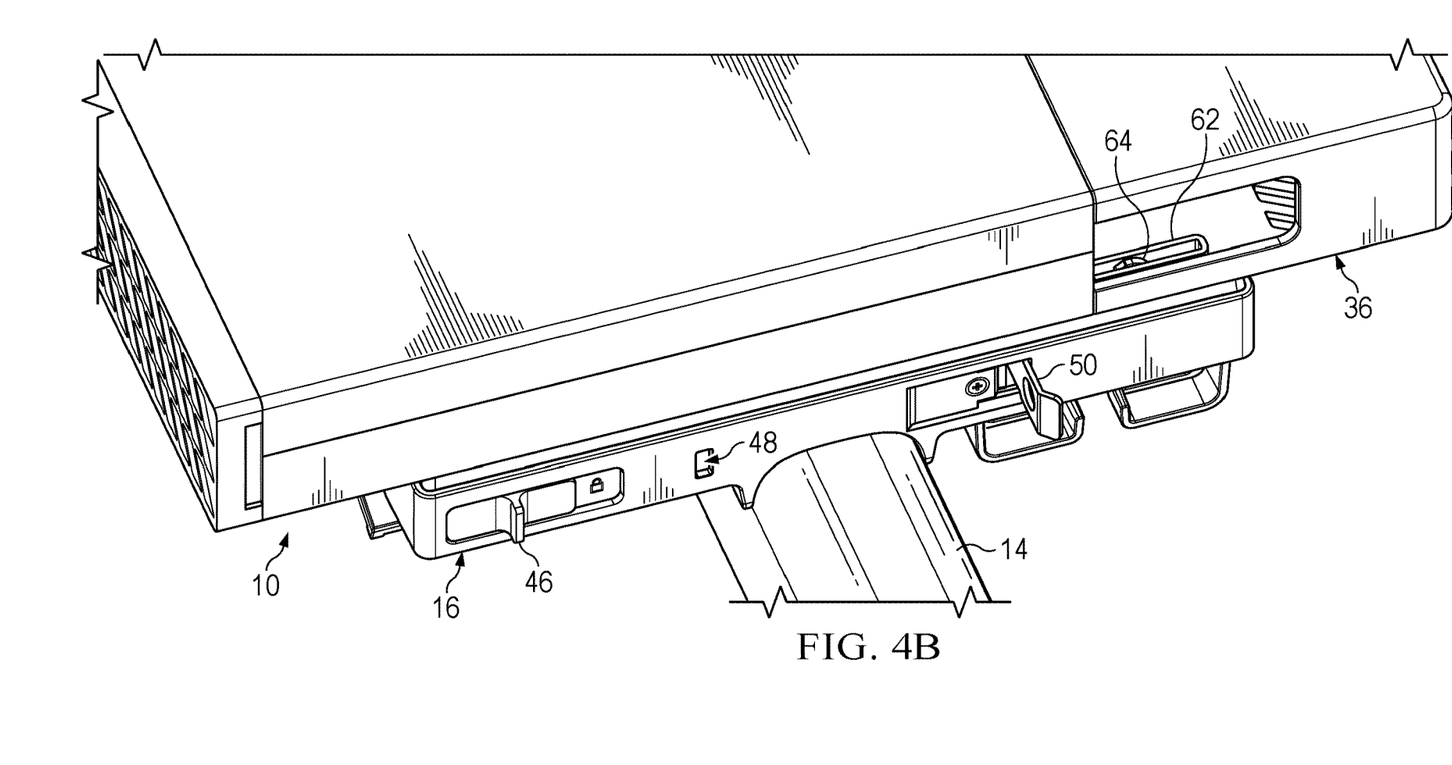

Referring now to FIGS. 4A and 4B, a lower perspective view depicts management of locking capability at locking mount 16. FIG. 4A depicts locking mount 16 with lock switch 46 slid to the unlock position so that information handling system 10 and cable cover 36 may be removed if desired by the end user. In the unlocked position, locking mount 16 blocks slot 48 to prevent coupling of a Kensington lock and prevents extension of padlock loop 50. The cable cover locking member opening 62 does not have the cable cover locking member 64 extended so that cable cover 36 may slide off of information handling system 10. In the state depicted by FIG. 4A, information handling system 10 and cable cover 36 rest in place on display 14 supported by locking mount 16, however, the system is unlocked so that removal may be accomplished. FIG. 4B depicts lock switch 46 slid to a locked position, which secures information handling system 10 and cable cover 36 from removal from display stand 14. When lock switch 46 slides to the locked position, slot 48 is unblocked so that a Kensington cable may couple in place and padlock loop 50 is released to extend out of locking mount 16. If a Kensington cable is inserted in slot 48 and/or a padlock is coupled to padlock loop 50, then lock switch 46 is prevented from sliding to the unlocked position. Cable cover securing member 64 extend through the cable cover slot 62 to prevent removal of the cable cover 36 when lock switch 46 is in the locked position. Advantageously, when lock switch 46 is in the unlocked position a lock will not couple to locking mount 16 so that information handling system 10 and cable cover 36 cannot fit in place in an unsecured manner with a lock coupled in place. Rather a lock can only couple to locking mount 16 when it has information handling system 10 and cable cover 36 secured.

Figure 5A:
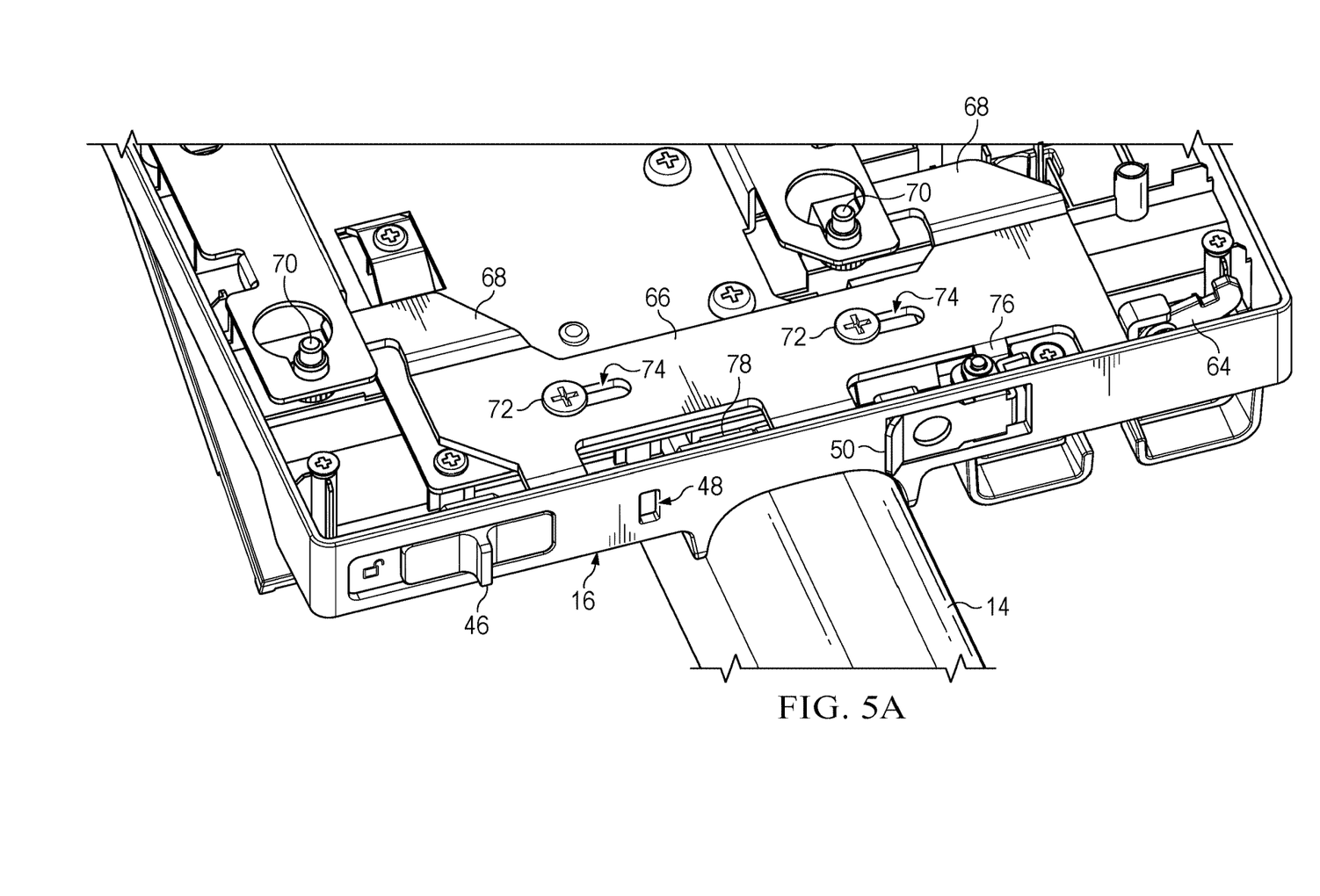
FIGS. 5A and 5B depict cutaway perspective views of the locking mount having a locking plate interfaced with the lock switch to slide between an unlocked position that allows removal of an information handling system and a locked position that prevents removal of an information handling system.
Figure 5B:
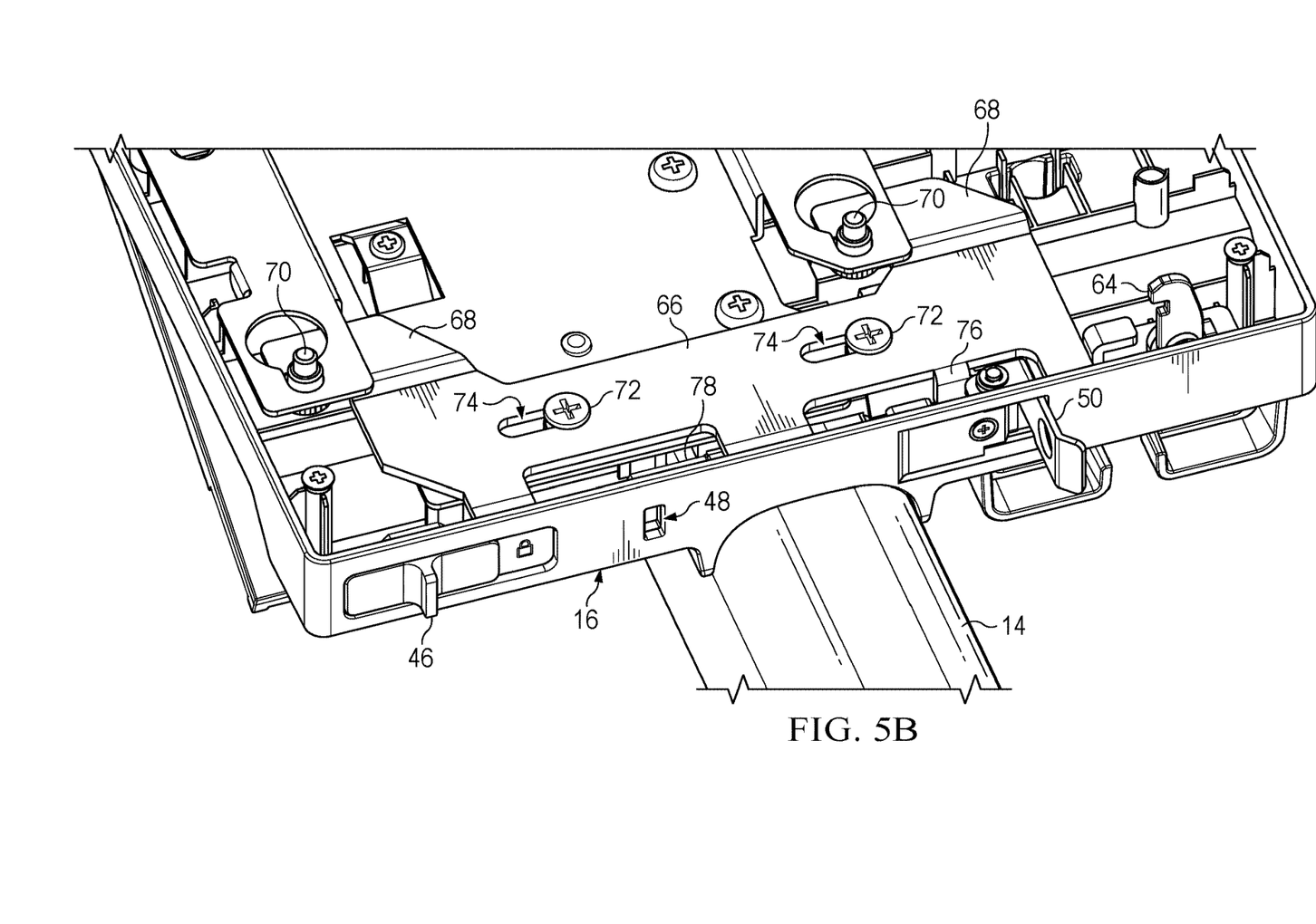

Referring now to FIGS. 5A and 5B, cutaway perspective views of locking mount 16 depict a locking plate 66 interfaced with lock switch 46 to slide between an unlocked position that allows removal of an information handling system and a locked position that prevents removal of an information handling system. FIG. 5A depicts lock switch 46 slid to the right in an unlocked position that is translated to lock plate 66, which slides at an opening 74 relative to a securing screw 72. A securing member 70 of the information handling system has inserted into first and second of the openings of locking mount 16 and is free to lift up and remove with lock plate 66 slid to a rightward position. A lock plate securing member 68 extends towards securing member 70 so that a rightward slide of lock plate 66 as shown in FIG. 5B captures securing member 70 and prevents upward lifting for removal of information handling system 10. In FIG. 5A, a blocking member 78 coupled to lock plate 66 or lock switch 46 is slid over slot 48 to prevent insertion of a Kensington lock cable end into locking mount 16. FIG. 5B depicts the lock switch 46 slid to the left, which translates to move blocking member 78 out of the way of slot 48 so that a Kensington lock cable can insert into the slot and thereby secure display stand 14 to an external object. FIG. 5A depicts lock plate 66 in an unlocked position with a padlock loop blocking member 76 aligned in the rightward position of lock plate 66 to prevent extension of padlock loop 50. This arrangement avoids a situation where a padlock might couple in place to give an illusion of security with the lock switch unlocked and the information handling system security members 70 free to remove. Instead, as shown by FIG. 5B, member 76 slides leftward when lock switch 46 slides to the locked position to free padlock loop 50 so that it can rotate downward and become available to accept a padlock. Member 76 in the leftward position prevents sliding of lock plate 66 rightward to an unlocked position when padlock loop 50 is extended out from locking mount 16. Similarly, cable cover securing member 64 retracts in FIG. 5A when lock switch 46 is in the unlocked position and extends in FIG. 5B when lock switch 46 slides to a locked position that is translated through lock plate 66.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having securing members extending from one side;
   a processor disposed in the housing and operable to execute instructions to process information;
   a memory disposed in the housing and interfaced with the processor, the memory operable to store the instructions and information;
   a peripheral display supported by a stand, the peripheral display interfaced with the processor and operable to present the information as visual images; and
   a locking mount coupled to the display stand and accepting the housing securing members to support the housing, the locking mount having a lock switch interfaced with a lock plate, the lock plate interfaced with the housing securing members and an exposed lock mechanism, the lock switch having an unlocked position and a locked position, the housing securing members engaged by the lock plate when the lock switch has the locked position and unengaged by the lock plate when the lock switch has the unlocked position, the exposed lock mechanism configured to accept an external lock when the lock switch has the locked position and unable to accept the external lock when the lock switch has the unlocked position.

2. The information handling system of claim 1 wherein: the exposed lock mechanism comprises a lock having a slot; the external lock comprises a cable having an end sized to secure in the slots; and a blocking member interfaced with the lock plate that blocks the slot when the lock switch has the unlock position and unblocks the slot when the lock switch has the locked position, insertion of the cable end into the slot securing the lock switch in the locked position.

3. The information handling system of claim 1 wherein:
the exposed lock mechanism comprises a padlock loop having an opening to accept a padlock;
the external lock comprises a padlock that couples to the padlock loop opening; and
a blocking member interfaced with the lock plate that secures the padlock loop in a retracted position when the lock switch has the unlock position, the retracted position preventing the padlock from coupling to the padlock opening, and that secures the lock switch in the locked position when the padlock loop extends from the retracted position.

4. The information handling system of claim 1 further comprising:
a cable cover operable to couple to one side of the housing and over cables extending from the housing; and
a cable cover lock member interfaced with the lock plate to extend into the cable cover when the lock switch has the locked position and retracts from the cable cover when the lock switch has the unlocked position.

5. The information handling system of claim 4 wherein the cable cover prevents access to the cables when coupled to the housing.

6. The information handling system of claim 1 wherein the locking mount comprises first and second exposed lock mechanisms interfaced with the lock plate, the first exposed lock mechanism locking the housing to the display stand, the second exposed lock mechanism locking the housing and the display stand to an external structure.

7. The information handling system of claim 6 wherein the first exposed lock mechanism comprises a padlock loop and the second exposed lock mechanism comprises a lock having a slot.

8. The information handling system of claim 1 further comprising:
a cable cover configured to couple over cables at one side of the housing; and
a cable cover lock member interfaced with the lock plate to extend into the cable cover when the lock switch has the locked position and retracts from the cable cover when the lock switch has the unlocked position.

9. The information handling system of claim 8 wherein the lock switch comprises a sliding switch at a bottom surface of the locking mount that couples to the lock plate to slide the lock plate between locked and unlocked positions.

10. A method for securing an information handling system, the method comprising:
inserting securing members extending from the information handling system into a locking mount coupled to a display stand;
sliding a lock switch from an unlock position to a locked position, the lock switch interfaced with a lock plate of the locking mount to engage the securing members and prevent release of the information handling system from the locking mount;
in response to sliding the lock switch to the locked position, unblocking a slot configured to accept an external securing cable; and
in response to the sliding the lock switch to the locked position, releasing a padlock loop to extend from a retracted position.

11. The method of claim 10 further comprising:
extending the padlock loop from the retracted position to an extended position; and
engaging the lock plate with the padlock loop extended position to lock the lock switch in the locked position.

12. The method of claim 10 further comprising:
inserting the external securing cable into the slot; and
engaging the lock plate with the securing cable to lock the lock switch in the locked position.

13. The method of claim 10 further comprising:
coupling a cable cover to the information handling system to capture cables of the information handling system; and
extending a cable cover lock member with the lock plate to engage the cable cover when the lock switch slides to the locked position.

14. The method of claim 10 wherein:
the securing cable couples the information handling system and display stand to an external object; and
the padlock loop when extended locks the information handling system to the display stand.

15. The method of claim 10 wherein the securing members comprise posts having a lip, the lock plate engaging the lip when the lock switch slides to the locked position.

16. An information handling system security device comprising:
a display stand configured to hold a display in a viewing position;
a locking mount coupled to the display support and having openings to accept information handling system housing securing members;
a lock switch coupled to the locking mount and configured to move between a locked position and an unlocked position;
a lock plate interfaced with the lock switch to move with the lock switch between the locked position and unlocked position; and
an exposed lock mechanism, the housing securing members engaged by the lock plate when the lock switch has the locked position and unengaged by the lock plate when the lock switch has the unlocked position, the exposed lock mechanism configured to accept an external lock when the lock switch has the locked position and unable to accept the external lock when the lock switch has the unlocked position.

17. The information handling system security device of claim 16 further comprising:
the exposed lock mechanism comprises a cable slot of the locking mount;
the external lock comprises a cable having an end sized to secure in the cable slot; and
a blocking member interfaced with the lock plate that blocks the cable slot when the lock switch has the unlocked position and unblocks the slot when the lock switch has the locked position, insertion of the cable end into the cable slot securing the lock switch in the locked position.

18. The information handling system security device of claim 16 further comprising:

the exposed lock mechanism comprises a padlock loop having an opening to accept a padlock;

the external lock comprises a padlock that couples to the padlock loop opening; and a blocking member interfaced with the lock plate that secures the padlock loop in a retracted position when the lock switch has the unlocked position, the retracted position preventing the padlock from coupling to the padlock opening, and that secures the lock switch in the locked position when the padlock loop extends from the retracted position.

19. The information handling system security device of claim 16 further comprising:

a cable cover operable to couple to one side of the information handling system housing and over cables extending from the housing; and a cable cover lock member interfaced with the lock plate to extend into the cable cover when the lock switch has the locked position and retracts from the cable cover when the lock switch has the unlocked position.

20. The information handling system security device of claim 19 wherein the locking mount comprises first and second exposed lock mechanisms interfaced with the lock plate, the first exposed lock mechanism locking the housing to the display stand, the second exposed lock mechanism locking the housing and the display stand to an external structure.

\* \* \* \* \*